(12) United States Patent
King

(10) Patent No.: US 6,679,464 B1
(45) Date of Patent: Jan. 20, 2004

(54) TAILGATE STORAGE BRACKET

(76) Inventor: David A. King, 22700 Lake Hill Dr., Chugiak, AK (US) 99567

( * ) Notice: Subject to any disclaimer, the term of this patent is extended or adjusted under 35 U.S.C. 154(b) by 99 days.

(21) Appl. No.: 10/040,029

(22) Filed: Oct. 18, 2001

(51) Int. Cl.[7] .............................................. F16M 11/00
(52) U.S. Cl. ........................ 248/201; 248/236; 248/240; 296/57.1; 211/99
(58) Field of Search ................. 296/180.1, 52, 296/57.1, 50, 53, 180.5; 211/105.1, 99; 248/201, 240, 236, 240.6, 202.1

(56) References Cited

U.S. PATENT DOCUMENTS

| | | | | |
|---|---|---|---|---|
| 2,088,757 A | * | 8/1937 | Olson | 296/57.1 |
| 3,895,838 A | * | 7/1975 | Hamada | 296/57.1 |
| 4,029,355 A | * | 6/1977 | Wilhelmsen | 296/57.1 |
| 5,039,154 A | * | 8/1991 | Lewis | 296/52 |
| 5,236,242 A | * | 8/1993 | Seeman | 296/180.1 |
| 5,352,008 A | * | 10/1994 | Denvir | 296/50 |
| 5,427,425 A | * | 6/1995 | Droesch | 296/50 |
| 5,605,367 A | * | 2/1997 | Mc Cormack | 296/57.1 |
| 5,641,262 A | * | 6/1997 | Dunlop et al. | 414/557 |
| 5,678,876 A | * | 10/1997 | Sargent et al. | 296/52 |
| 5,711,569 A | * | 1/1998 | Sovoda | 296/57.1 |
| 6,550,838 B2 | * | 4/2003 | Bobbitt et al. | 296/52 |

* cited by examiner

*Primary Examiner*—Kimberly Wood
(74) *Attorney, Agent, or Firm*—Michael J. Tavella

(57) ABSTRACT

A bracket system that supports a tailgate. The brackets can be mounted to a garage wall, for example. The tailgate is then attached to the brackets. The tailgate can be stored in an upright position, flat against the wall. The brackets also allow the tailgate to fold down and be used as a table.

10 Claims, 6 Drawing Sheets

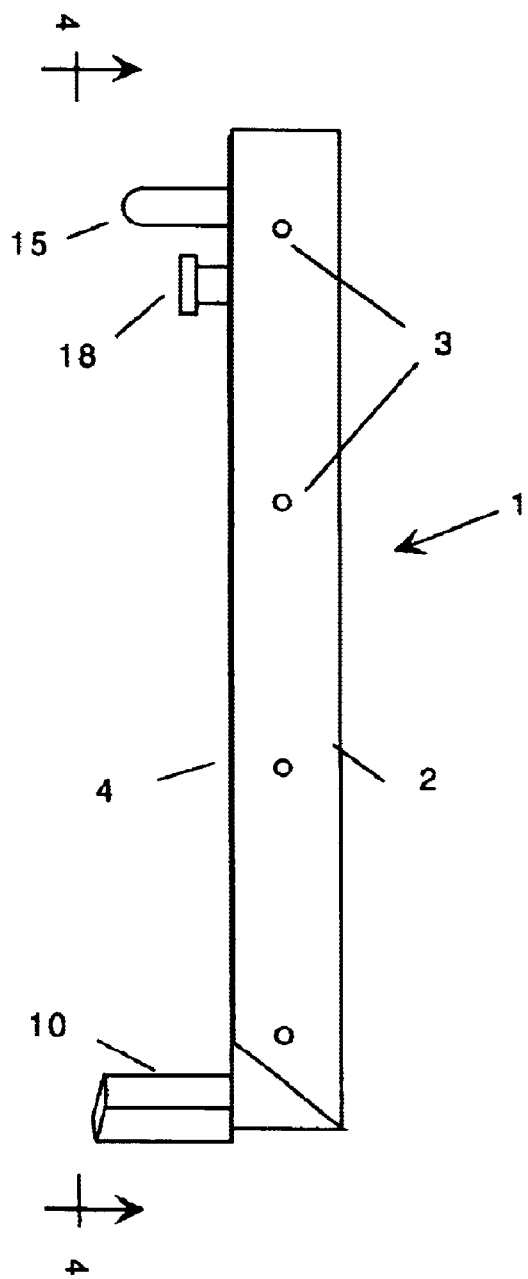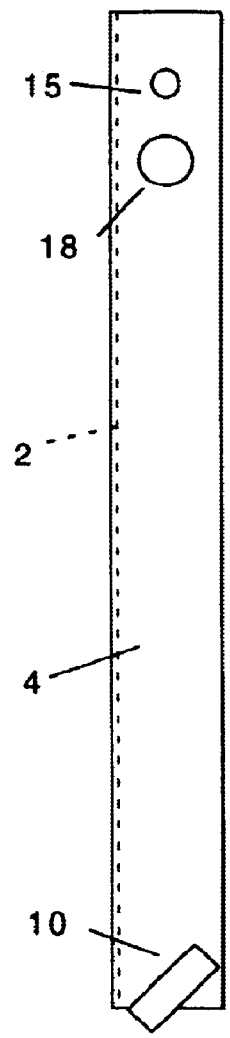
Figure 3
Figure 4

TAILGATE STORAGE BRACKET

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to bracket supports and particularly to brackets supports for holding pickup truck tailgates.

2. Description of the Prior Art

Pickup trucks have long been a standard fixture in construction and farming. Lately they have also become popular for homeowners. These trucks are now being built in several sizes and styles. Characteristic of the pickup is the fold-down tailgate. This tailgate allows the user access to the bed for loading and unloading. It also secures loads in the bed when closed. For many users, the tailgate is not needed. Some people, prefer to use a lightweight cargo net instead of the tailgate, as this improves gas mileage. Others put camper units in the bed, which require the removal of the tailgate. Regardless of the reason, once the tailgate is removed, it becomes a problem for storage. Often, people leave the tailgates on the ground in a yard, or store it on the garage floor. This type of storage causes problems because the tailgate can become damaged or rusted. Many times, the tailgate is just "in the way" and is a useless object just taking up space.

BRIEF DESCRIPTION OF THE INVENTION

The instant invention overcomes this problem. It is a bracket system that supports a tailgate. The brackets can be mounted to a garage wall, for example. The tailgate is then attached to the brackets. The tailgate can be stored in an upright position, flat against the wall. The brackets also allow the tailgate to fold down and be used as a table.

The brackets are metal or high-strength plastic angle members. The bottom of the members is bent to 90 degrees, which gives the member an "L" shape. The brackets have mounting holes for attachment to a wall. The brackets also have hinge pins at the bottom of the "L" to accept the existing hinge trunnions on the tailgate. Lugs are provided to connect the tailgate cables and another set of lugs is used to latch the tailgate in the upright position.

When installed on the brackets, the tailgate operates as it normally does. Once the hinges and cables are secured, the tailgate is pushed up until it engages the upper latching lugs. To release the tailgate for use as a table, the user pulls the release handle and lowers the tailgate.

In this way, the tailgate can be stored out of the way safely. The tailgate is no longer an obstruction. Moreover, the tailgate is less likely to be damaged. Finally, the tailgate now provides a convenient table for use in a workshop or garage for a variety of uses.

BRIEF DESCRIPTION OF THE DRAWINGS

FIG. 3 is a front elevation view of the right side bracket of the invention.

FIG. 3a is a front elevation view of the left side bracket of the invention.

FIG. 4 is a left side elevation of the right bracket taken along the lines 4—4 of FIG. 3.

FIG. 4a is a left side elevation of the left bracket taken along the lines 4a—4a of FIG. 3a.

DETAILED DESCRIPTION OF THE INVENTION

Figure 1:
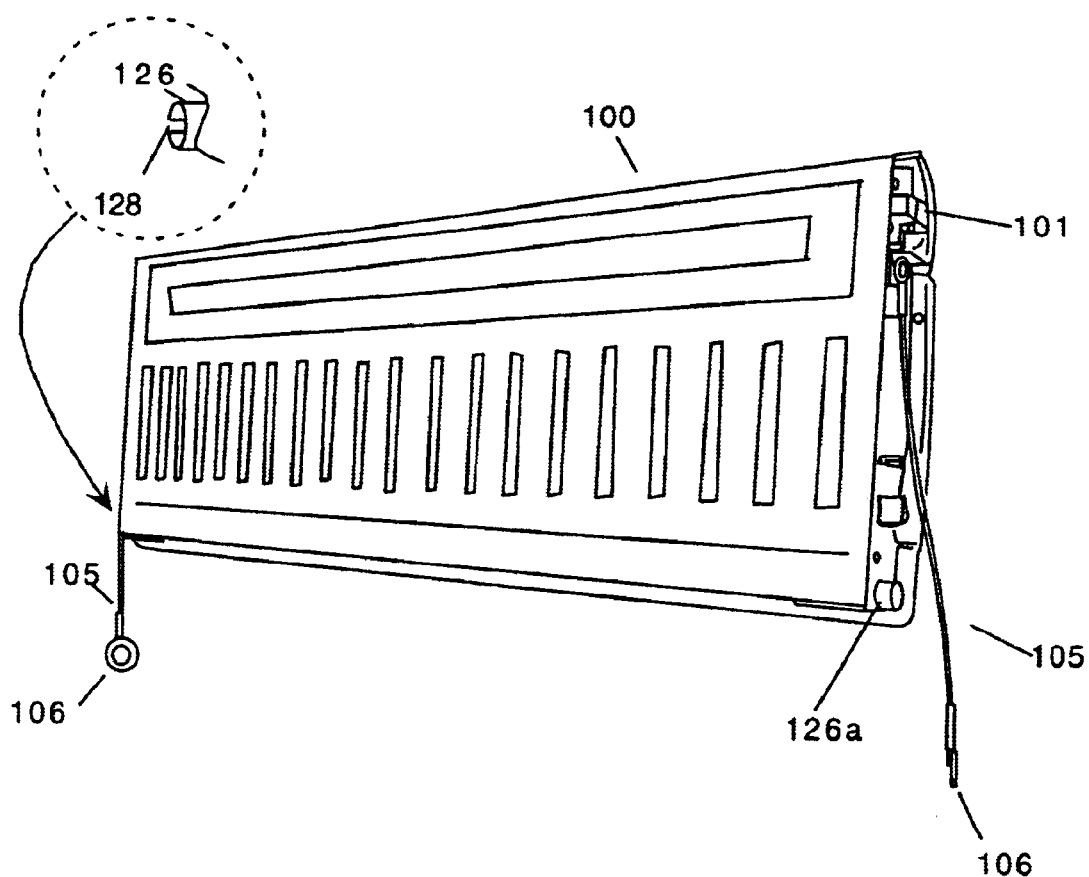
FIG. 1 is a perspective view of a prior art tailgate that has been removed from a vehicle.

Referring now to FIG. 1, a typical tailgate 100 is shown. On both sides of the tailgate, there is a suitable conventional latch mechanism 101, only one of which is shown. The latch mechanism 101 typically engages a striker mechanism 102 on the truck side wall (see FIG. 2). Note that there are two strike plates 102, although only one is shown. As is also conventional, the tailgate 100 is further provided with two flexible cables 105, each of which is secured at one end of the tailgate 100 near the latch mechanisms 101 as shown in FIG. 1. The other end of each strap 105 has a suitable ring-type fastener 106, that engages typical pin fasteners 107 mounted on the side panels 120 of the truck (see FIG. 2), just below the striker mechanisms 102. When the cables 105 have their ring-type fasteners 106 engaged with the pin fasteners 107, and the tailgate 101 is pivotally lowered to its horizontal open position, the cables 105 maintain the tailgate 101 in its horizontal open position. When the ring-type fasteners 106 are disengaged from the pin fasteners 107, the tailgate 100 may be removed from the vehicle.

Figure 2:
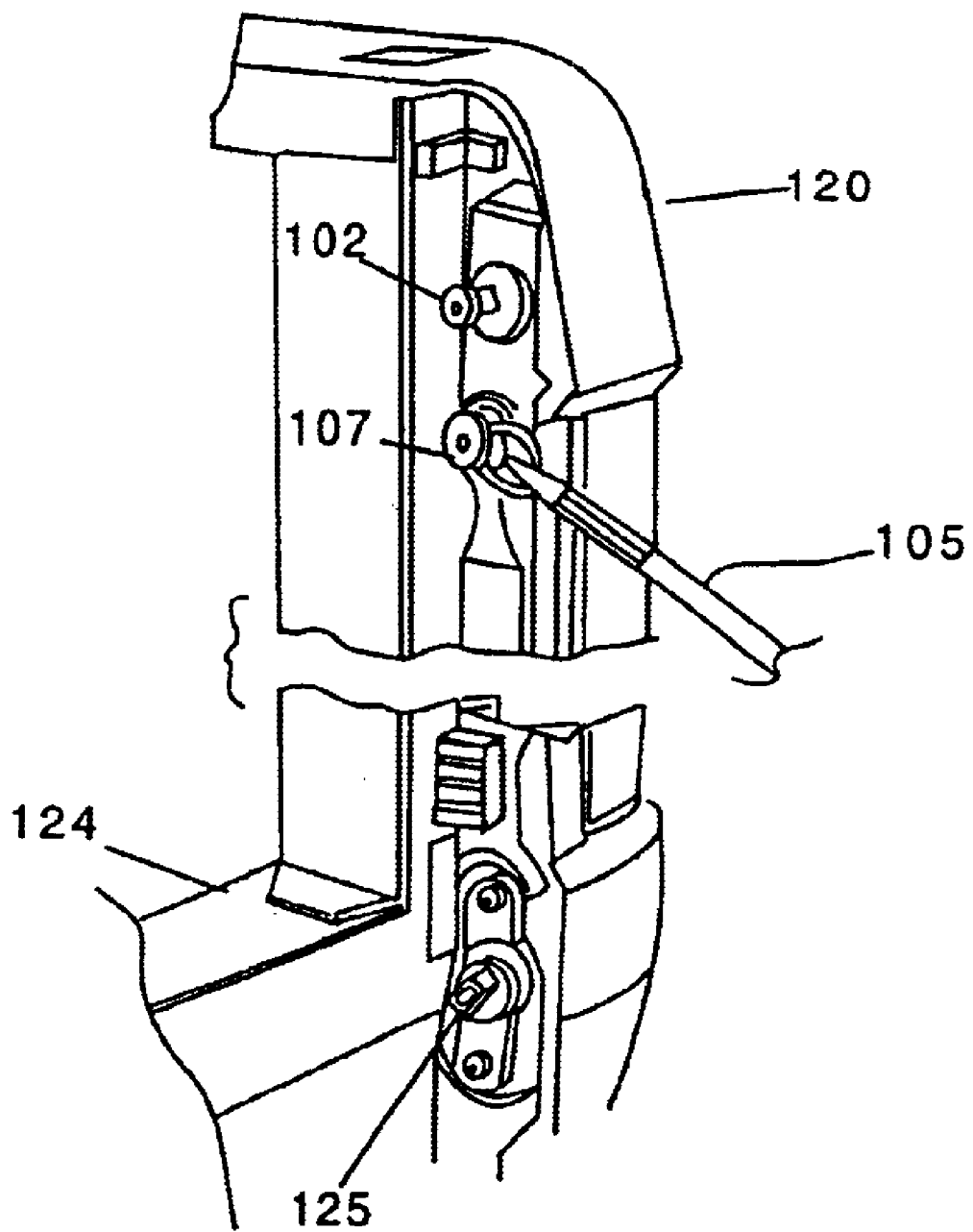
FIG. 2 is a rear perspective view of the right rear end of a typical prior art pickup truck showing the tailgate removed and one of the support cables installed on a connection post.

FIG. 2 shows the right side panel 120 of a typical vehicle. This figure shows a FORD style pickup bed. On this truck, a stub shaft 125 is placed at a vertical height, which essentially corresponds to the level of the truck bed 124. On the left side (not shown) is a hinge pin. The tailgate 100 has a pair of trunnions 126 and 126a. On the right side of the tailgate, the trunnion 126 has a slot 128 (see inset on FIG. 1), that fits over the stub shaft 125 when the tailgate is in place. Once inserted on the stub shaft and hinge pin, the tailgate 100 may be pivoted relative to the side panels of the vehicle. This mechanism effectively acts as a pair of hinges for the tailgate when it is installed on the vehicle.

As mentioned above, the right trunnion 126 has a slot 128, which is angularly aligned with respect to the stub shaft 125 when the tailgate 100 is pivoted to an angle of approximately 45 degrees with respect to the vertical side panels 120 of the truck. This permits disengagement of the trunnion 126 from the stub shaft 125 and thereby, in turn, permits removal of the tailgate 100 from the truck by pulling the tailgate off the hinge pin on the left side of the vehicle. Although this structure is prior art, it has been discussed in detail because the operating parts of the tailgate are used in the instant invention as discussed below. As noted above, this discussion and the drawings illustrate the FORD type of truck. Other manufacturers use different designs for these components. Although every manufacturer has different designs, the basic components are the same. There are longer hinge parts that the tailgate rotates on. There are latch pins that secure the tailgate in a closed position. And there are cable latches to secure the support cables. The exact position of these components will vary from truck to truck, but they all will be present on the vehicle.

As a result, the actual configuration of the brackets (discussed below) will vary from truck to truck. However, the design principals and details are the same for every truck. Modifying the brackets to fit a particular model of truck is simply a matter of choosing compatible components for that vehicle. This type of selection is well within the capabilities of someone of ordinary skill in the art.

As noted above, after tailgates are removed from vehicles, storing them in a safe and protected manner is difficult. The instant invention overcomes these problems by providing a storage system for tailgates.

Figures 3A, 4A:
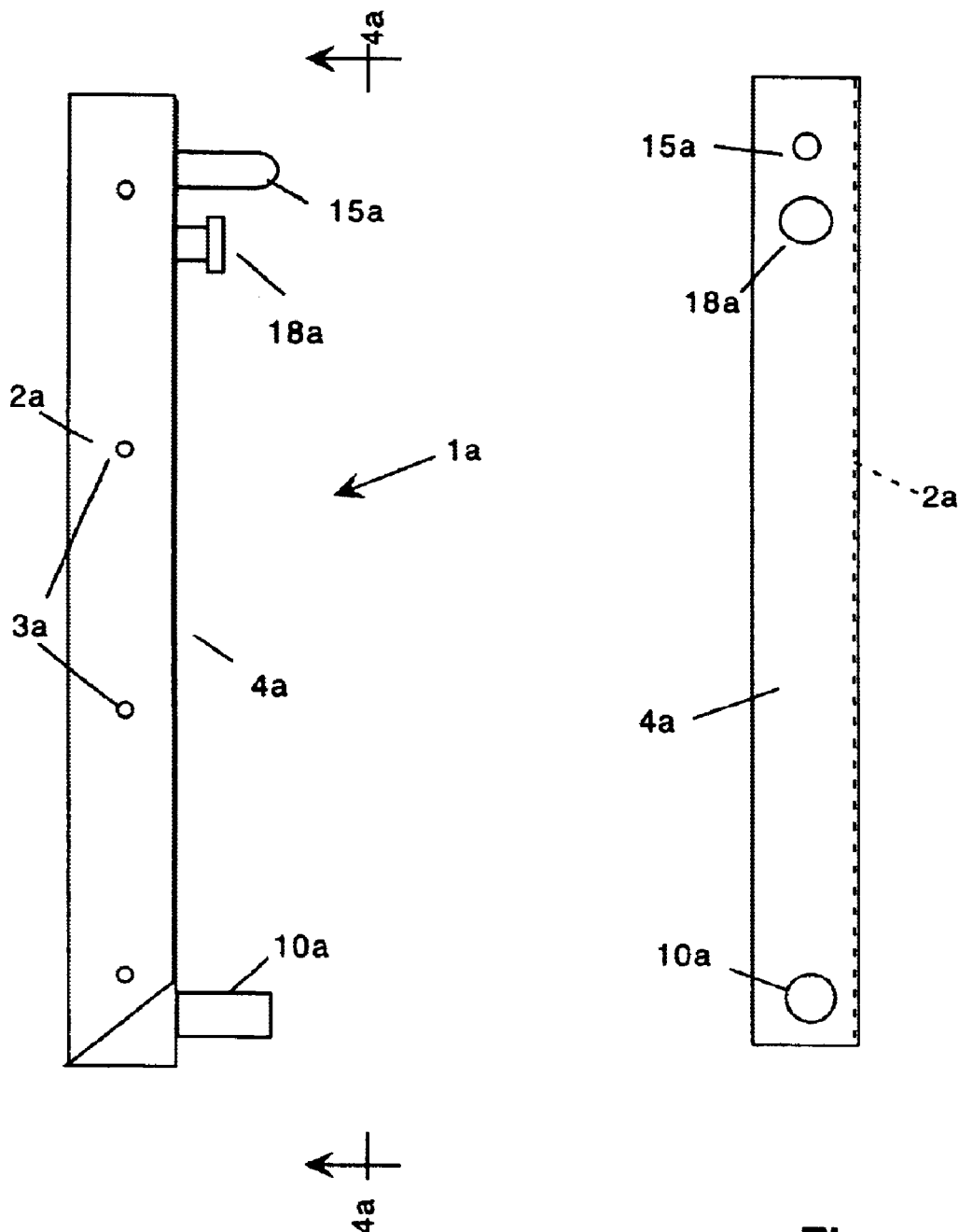

Referring now to FIGS. 3, 3a, 4 and 4a details of the system are shown. The support system consists of a pair of brackets 1 and 1a. FIG. 3 shows a front view of the right side bracket 1. This bracket 1 is formed of angle bracket stock. Steel, aluminum or high strength plastics may be used, but steel is the preferred material. The angle bracket has two faces. Face 2 is designed to be placed against a wall or on a post or other support medium. It has several mounting holes 3 to secure the bracket to the support medium. The bracket is installed using common fasteners, suitable for the purpose.

The second face 4 is perpendicular to the face 2. It has mounting hardware for the tailgate. At the bottom of the bracket is a box member hinge pin 10. Note that this pin is generally rectangular and is angled to match the angle of the slot 128 in the trunnion 126.

Near the top of the bracket, and corresponding with the positions of the latch mechanism 101 is a striker mechanism 15. Just below the striker mechanism is a pin fastener 18, which corresponds to fasteners 107 found on the vehicle side walls.

FIG. 3a shows a front view of the left side bracket 1a. This bracket is also formed of angle bracket stock. The angle material has two faces. As with the e right bracket face 2a is designed to be placed against a wall or on a post or other support medium. It also has several mounting holes 3a to secure the bracket to the support medium. When the brackets are installed they must be positioned at the same level so that the tailgate installation hardware is aligned (see, e.g., FIG. 6).

As shown in FIG. 4a, the second face 4a is perpendicular to the face 2a. It has mounting hardware for the tailgate. At the bottom of this bracket is a hinge pin 10a. Here, this is simply a cylindrical pin. Near the top of the bracket, and corresponding with the positions of the latch mechanism 101 is a striker mechanism 15a. Just below the striker mechanism is a pin fastener 18a, which corresponds to fasteners 107 found on the vehicle side walls. The latter two components are the same as those on the right bracket 1.

When the tailgate 100 is to be installed on brackets, the trunnion 126a on the left side of the tailgate is maneuvered such that the trunnion 126a is aligned with the hinge pin 10a on the left bracket 1a, and slipped on the pin 10a. Then, the tailgate 101 is maneuvered further such that the hinge pin 10 is inserted into the radial slot 128 of the trunnion 126 on the right side of the tailgate. At this point, the tailgate 100 may then be pivoted upwardly toward its vertical closed position in the brackets. In order to secure or lock the tailgate 100 in its vertical closed position, the latch mechanisms 101 engage the striker plates 15 and 15a located at the top of the brackets.

Once the tailgate is placed on the hinge pins 10 and 10a the support cables are attached to the pin fasteners 18 and 18a on the brackets. In this way, the tailgate can then be placed in an open position for use as a table within the storage area.

Figure 5:
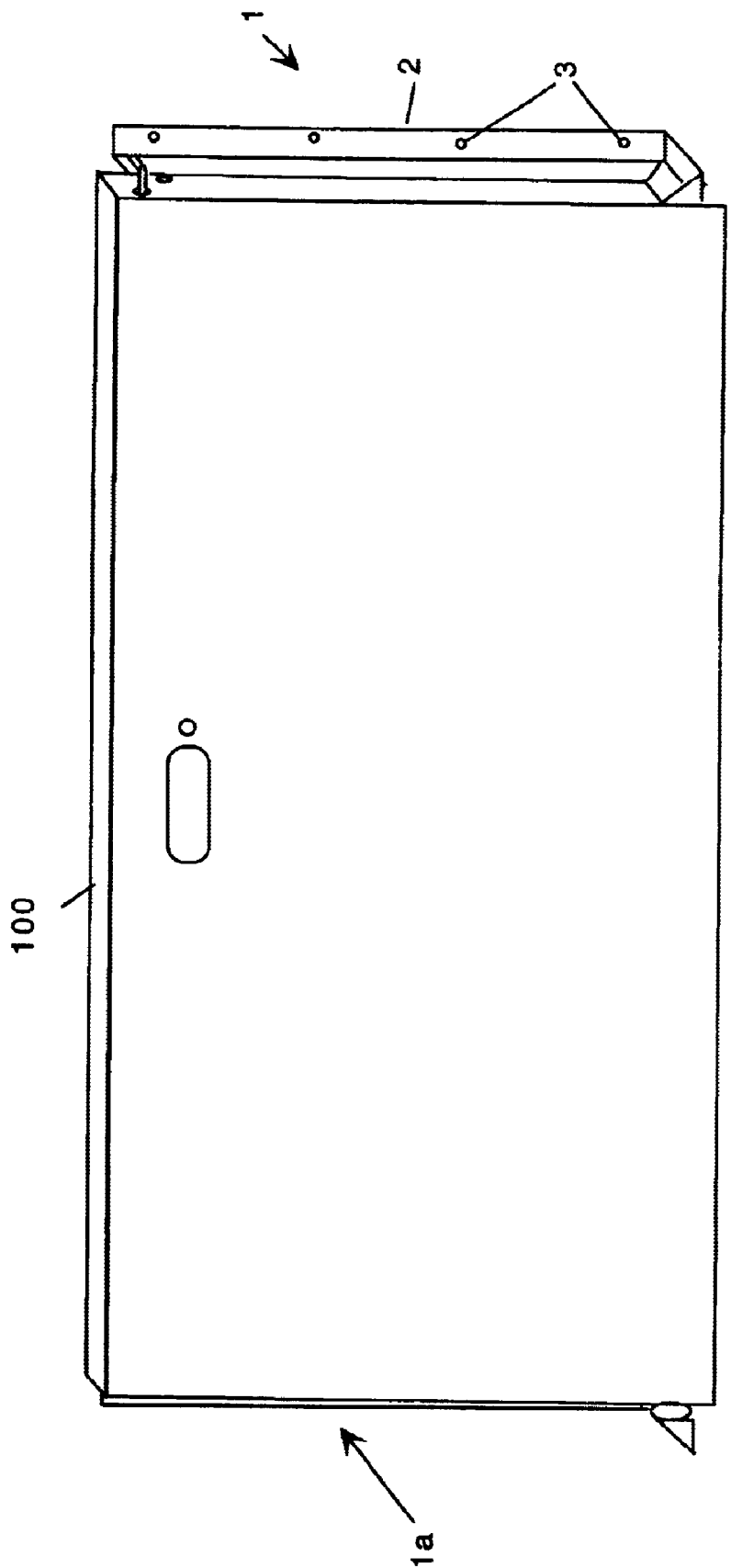
FIG. 5 is a perspective view of the invention with a tailgate in place in the closed position.
Figure 6:
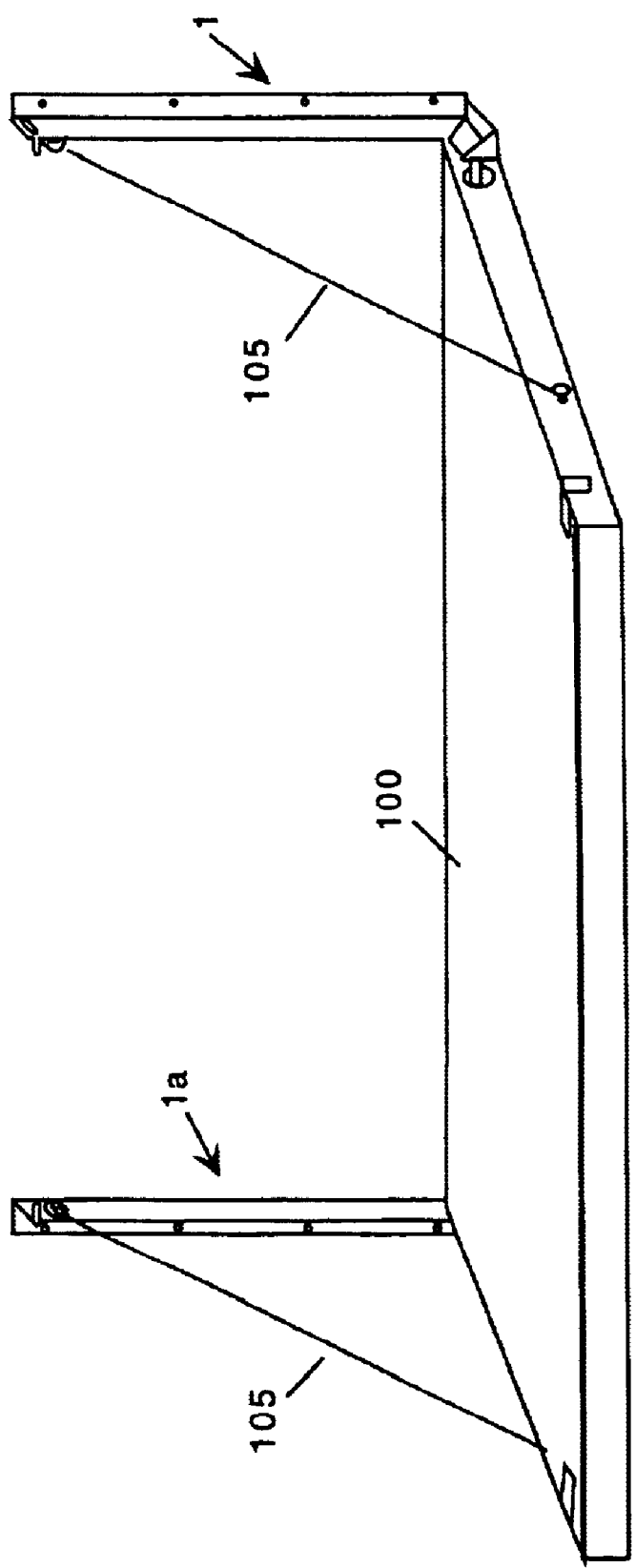
FIG. 6 is a perspective view of the invention with a tailgate in place in the open position.

FIG. 5 shows the tailgate 100 in its closed position. FIG. 6 shows the tailgate in its opened position showing the support cables in place. In the open position, the tailgate can be used as a small table or workbench. There are many possible uses for the tailgate when it is in the open position. If such uses are not desired or needed, the tailgate can be placed in the closed position, where it remains relatively flat against a wall surface-thus being out of the way of normal uses for such a space.

The tailgate is opened in a normal manner by releasing the latch and pulling it down, away from the striker plates. Similarly, to store the tailgate, it is lifted and pushed against the striker plates to secure the latch mechanisms.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. In combination a flat vertical mounting surface and a support system for mounting a tailgate away from a vehicle, said tailgate having a pair of hinge trunnions, a pair of latches and a pair of support cables, comprising:
   a) a first bracket, having a top and a bottom, said first bracket having a means for attaching said first bracket to the flat, vertical mounting surface such that said first bracket maintains a vertical position, a means for securing one of said pair of hinge trunnions of said tailgate, mounted to the bottom of said first bracket, and a means for securing one of said pair of latches on said tailgate, mounted on the top of said first bracket; and
   b) a second bracket, having a top and a bottom, said second bracket having a means for attaching said second bracket to the flat, vertical mounting surface such that said second bracket maintains a vertical position, in a spaced apart relation to said first bracket, a means for securing one of said pair of hinge trunnions of said tailgate, mounted to the bottom of said second bracket, and a means for securing one of said pair of latches on said tailgate, mounted on the top of said second bracket.

2. The support system of claim 1 further comprising:
   a) a means for securing one of said pair of support cables, fixedly attached to said first bracket; and
   b) a means for securing one of said pair of support cables, fixedly attached to said second bracket.

3. The support system of claim 1 wherein the means for securing one of said pair of hinge trunnions of said tailgate on said first bracket is adapted to receive a slotted trunnion from a tailgate.

4. The support system of claim 1 wherein the means for securing one of said pair of hinge trunnions of said tailgate on said first bracket comprises a box member, extending outwardly from the bottom of said first bracket, whereby said box member is adapted to receive a slotted trunnion from a tailgate, such that said box member acts as a first hinge for said tailgate.

5. In combination a flat vertical mounting surface and a support system for mounting a tailgate away from a vehicle, said tailgate having a pair of hinge trunnions, a pair of latches and a pair of support cables, comprising:
  a) a first bracket, said first bracket having
    a first flange, said first flange having a plurality of mounting holes therein, and
    a second flange, attached to said first flange orthogonally thereto, said second flange of said first bracket having an upper portion and a lower portion said second flange further including
      a hinge pin, attached to the lower portion of said second flange,
      a latch bolt, attached to the upper portion of said second flange, and
      a means for attaching a support cable attached to said second flange; and
  b) a second bracket, said second bracket having
    a first flange, said first flange of said second bracket having a plurality of mounting holes therein, and
    a second flange of said second bracket, attached to said first flange of said second bracket orthogonally thereto, said second flange having an upper portion and a lower portion said second flange further including
      a hinge pin, attached to the lower portion of said second flange of the second bracket,
      a latch bolt, attached to the upper portion of said second flange of the second bracket, and
      a means for attaching a support cable attached to said second flange of the second bracket.

6. The support system of claim 5 wherein the hinge pin on said second flange of said first bracket is adapted to receive a slotted trunnion from a tailgate.

7. The support system of claim 5 wherein the hinge pin on said second flange of said first bracket further comprises a box member, extending outwardly from said second flange of said first bracket, whereby said box member is adapted to receive a slotted trunnion from a tailgate, such that said box member acts as a first hinge for said tailgate.

8. The method of storing a tailgate on a flat vertical mounting surface away from a vehicle using a tailgate support system having
  a first bracket, said first bracket having a first flange, said first flange having a plurality of mounting holes therein,
  a second flange, attached to said first flange orthogonally thereto, said second flange having an upper portion and a lower portion, said second flange further including
    a hinge pin, attached to the lower portion of said second flange,
    a latch bolt, attached to the upper portion of said second flange, and
    a means for attaching a support cable attached to said second flange; and
  a second bracket, said second bracket comprising
    a first flange, said first flange having a plurality of mounting holes therein, and
    a second flange, attached to said first flange orthogonal thereto of the second bracket, said second flange having an upper portion and a lower portion said second flange further including
      a hinge pin, attached to the lower portion of said second flange of the second bracket;
      a latch bolt, attached to the upper portion of said second flange of the second bracket, and
      a means for attaching a support cable attached to said second flange of the second bracket; comprising the steps of:
        a) attaching said first and second brackets to the flat, vertical mounting surface such that said first and second brackets maintain a vertical position, and further such that the latch bolts on said first and second brackets and the hinge pins on said first and second brackets are oppositely disposed and spaced apart at a fixed distance;
        b) placing a tailgate having hinge pin receivers and latch bolt receivers between said first and second brackets such that hinge pin receivers on said tailgate align with said hinge pins;
        c) securing said tailgate on said hinge pins; and
        d) rotating said tailgate on said hinge pins until latch bolt receivers on said tailgate engage said latch bolts on said first and second brackets.

9. The method of claim 8 where said tailgate further includes a pair of suppprt cables, further comprising the steps of:
  a) before rotating said tailgate in step d, attaching each of said pair of support cables to one of said means for attaching a support cable on said first and second brackets.

10. The method of claim 9 further comprising the steps of:
  a) opening said latch bolt receivers on said tailgate; and
  b) lowering said tailgate into a horizontal position until said pair of support cables are fully extended, whereby said tailgate can be used as a table in said horizontal position.

* * * * *